United States Patent [19]

Barfurth et al.

[11] Patent Number: 4,578,487
[45] Date of Patent: Mar. 25, 1986

[54] BINDING AGENTS CONTAINING TITANIC ACID ESTERS FOR THE PREPARATION OF COATING COMPOSITIONS AND REFRACTORY BODIES, AND A METHOD FOR THE PREPARATION OF THESE BINDING AGENTS

[75] Inventors: Dieter Barfurth, Troisdorf; Heinz Nestler, Troisdorf-Eschmar, both of Fed. Rep. of Germany

[73] Assignee: Dynamit Nobel Aktiengesellschaft, Troisdorf, Fed. Rep. of Germany

[21] Appl. No.: 461,072

[22] Filed: Jan. 26, 1983

[30] Foreign Application Priority Data

Feb. 3, 1982 [DE] Fed. Rep. of Germany ....... 3203546

[51] Int. Cl.$^4$ ................................................ C07F 7/28
[52] U.S. Cl. ......................................... 556/40; 556/54; 556/55; 556/56
[58] Field of Search .......................... 260/429.5, 429 J

[56] References Cited

U.S. PATENT DOCUMENTS

| | | | |
|---|---|---|---|
| 2,824,114 | 2/1958 | Bostwick | 260/429.5 |
| 2,913,469 | 11/1959 | Russell | 260/429.5 |
| 3,002,854 | 10/1961 | Brill | 260/429.5 X |
| 3,004,863 | 10/1961 | Gray et al. | 260/429.5 X |
| 3,006,941 | 10/1961 | Mudrak et al. | 260/429.5 X |
| 3,017,282 | 1/1962 | Brill | 260/429.5 X |
| 3,153,000 | 10/1964 | Takimoto et al. | 260/429 J |
| 3,334,067 | 8/1967 | Weyenberg | |
| 3,337,391 | 8/1967 | Clayton et al. | 260/429.5 X |
| 3,856,839 | 12/1974 | Smith et al. | 260/429.5 |
| 4,113,757 | 9/1978 | Kay | 260/429 J X |
| 4,232,062 | 11/1980 | Okino et al. | 260/429 J X |

OTHER PUBLICATIONS

Yamamoto et al., JACS 79, 4344–48 (1957).

*Primary Examiner*—Helen M. S. Sneed
*Attorney, Agent, or Firm*—Felfe & Lynch

[57] ABSTRACT

The present invention relates to binding agents for coating compositions which can be used for making foundry molds. The new compositions contain known polymeric titanic acid esters which are treated with chelating agents. The preferred chelating agents are beta-dioxo compounds. The chelating agents are contained in the binding agent in amounts between 0.2 and 1 gram molecule per gram atom of titanium. The new binding agents can be prepared in a simple manner from titanic acid esters, water and the chelating agent, the amount of water being selected in accordance with the degree of condensation desired in the polymeric titanic acid ester.

14 Claims, No Drawings

BINDING AGENTS CONTAINING TITANIC ACID ESTERS FOR THE PREPARATION OF COATING COMPOSITIONS AND REFRACTORY BODIES, AND A METHOD FOR THE PREPARATION OF THESE BINDING AGENTS

BACKGROUND OF THE INVENTION

The subject matter of the present invention is binding agents on the basis of chelated titanic acid esters. These binding agents are used both for the manufacture of ceramic moldings, such as for example casting molds or casting cores for metal casting, and in internal coating compositions for the protection of, for example, crucibles made of material that is not resistant to molten metals, in which aggressive metals or alloys are to be melted.

It is known to cast metals in ceramic molds. For the manufacture of such molds, finely divided refractory material is mixed with a usually silicatic binding agent, and the mixture is then applied to a model by immersion or spraying or by pouring it over the model. Such molds are hardened by simply drying them, or by applying a gaseous, liquid or solid hardener, such as ammonia, such that a gel is formed of the liquid binding agent, which, in the case of the silicatic binding agents commonly used, is converted in the firing to silicon dioxide. In the lost-wax or investment molding process that is frequently used, the wax model is built up with layer after layer of ceramic slip by repeated dipping, each layer being sprinkled, while still moist, with coarse refractory grits and dried. After the last layer is dry, the model is melted out, and the mold is fired in a kiln.

However, satisfactory casting results are not always obtained with the molds and cores made by these known methods. Especially in the casting of high-alloy steels and steels of high carbon or chromium content, and in the casting of titanium, reactions with components of the mold frequently occur, so that the castings thus obtained have flawed surfaces.

These flaws can also occur when the said metals or alloys are first melted down or held in the molten state in crucibles made of siliceous material, such as clay for example, before they are poured.

One known possibility of preventing such defects is the use of silicon-free binding agents for the molds or coatings. The derivatives of titanium, aluminum or zirconium which are similar to ethyl silicate, however, are far more sensitive to hydrolysis than the organic silicates, since they are degraded merely by atmospheric moisture. Therefore it is not easily possible to adapt the methodologies known in silicate chemistry to these binding agent starting materials. The method described in German Patent No. 2,204,531 indicates an approach to overcoming this difficulty by reducing the sensitivity to hydrolysis of aluminum sec.-butylate, zirconium n-butylate or zirconium n-propylate and tetra-isopropyl titanate, for example, by adding to them certain chelating agents, to such an extent that they can be used in preparing binding agents, or they can be mixed with appropriate refractory materials for the preparation of silicon-free slips. The slips made with these silicon-free binding agents, however, have the disadvantage that, when they are used for the internal coating of clay or mullite crucibles, they have, after firing at 700° C., surfaces which are either relatively soft or crazed and thus unable to serve their purpose in an optimum manner.

The problem therefore was to find a binding agent for slips of refractory material, which, after the slip made from it has hardened, yields casting molds for aggressive metals or metal alloys, such that these molds will have a surface that is strong, free of crazing, and resistant to attack by the said metals in the molten state. It is also to be possible to use the slips for preparing internal coatings in crucibles or other vessels made of clay or siliceous material and serving to contain aggressive molten metals or metal alloys.

THE INVENTION

To provide a solution to this problem, a binding agent for coating compositions on the basis of chelated titanic acid esters has been found, which is characterized by the fact that the titanic acid ester is a polymeric titanic acid ester.

Slips which are prepared with such a binding agent have proven to be superior for the preparation of investment molds to those slips whose binding agents are made from chelated monomeric metal compounds in accordance with the state of the art described above. Chelated polymeric titanium compounds are obtained by mixing polymeric titanic acid esters, such as for example polymeric butyl titanate, with chelating agents such as acetylacetone, aceto-acetic acid ethyl ester or triethanolamine. Polymeric alkyltitanate is first prepared by partial condensation from the corresponding monomeric alkyltitanate, or—usually—from titanium tetrachloride by reaction with aqueous alcohol, i.e., by simultaneous esterification and partial condensation.

The preparation of the chelated polymeric titanium compounds, however, can also begin with a monomeric titanate, such as tetra-n-butyltitanate, if water and the chelating agent are simultaneously added to it, and neither will the water interfere with the chelation nor will the chelating agent interfere with the condensation; the alcohol that is separated is removed by distillation. For example, by adding to one mole of butyltitanate a mixture of 0.8 mol of water, 0.8 mol of acetylacetone and 0.6 mol of butanol (for solubilization), heating the mixture to about 120° C. and distilling off 2.2 mol of butanol, a product is obtained having a titanium dioxide content of approximately 25%, which is corresponds to a product which is formed by the mixing of (theoretically) one gram atom of titanium in the form of polymeric butyltitanate with 0.8 gram molecule of acetyl acetone. This simple and unforeseen method for the preparation of the new binding agents also has the additional advantage that predetermined molar ratios or desired properties can be maintained far more easily and much more accurately by setting out from monomeric, precisely defined titanate than by setting out from a polymeric titanate which simply as a technical product has a nonuniform degree of condensation, titanium dioxide content and viscosity.

The ester component of the titanate is preferably an alkyl ester group having 1 to 8 carbon atoms, preferably 2 to 5 carbon atoms.

Suitable chelating agents for the binding agent of the invention are the beta-dioxo compounds known as chelating agents, such as for example acetylacetone, acetoacetic acid ethyl ester, benzoylacetone and dibenzoylmethane, or poly-oxy compounds, as e.g. polyvalent alcohols which have a valence of 2, 3 or more, and which may contain nitrogen if desired, examples being ethanediol-1,2, 2-methylpentanediol-(2,4), 2-ethylhexane-diol-(1,3), glycerine, and di- or triethanolamine. Compounds of the group of the oxy-oxo compounds, such as for example lactic acid or diacetone alcohol, can also be used as chelating agents.

The amount of chelating agent to be added must, on the one hand, suffice to prevent the immediate hydrolysis of the titanate during the preparation of the slip; on the other hand, however, it must not be so great as to undesirably reduce the reactivity of the binding agent with the atmospheric humidity after the slip has been applied. Additions amounting to about 0.2 to 1 mole of chelating agent per titanium atom best accomplish the proposed purpose.

When the binding agent of the invention is prepared from a monomeric titanate by the addition of chelating agents and water, the amount of water that is used for the formation of the polymer is preferably between 0.5 and 1 gram molecule of water per gram atom of titanium. The titanium content of the polymeric product will then be between 20 and about 35% Titanium dioxide ($TiO_2$) by weight, depending on which altitanate and which chelating agent is used and to what extent the alcohol split off from the titanate has been distilled out. Preferably the titanium content of the new binding agent is between 22 and 33% titanium dioxide by weight; this corresponds to a degree of condensation of 3 to 5 titanium atoms per polymeric titanium compound.

The alcohol that is released during the chelation does not need to be distilled out since, when the binding agent of the invention is used in slips intended to serve as coating compositions or foundry cores, it can serve simultaneously as a solvent or vehicle therefor. But when certain refractory substances are used in the slip, a higher titanium dioxide content is desired in the binding agent, depending on the application; in the latter case the alcohol is partially or completely distilled out. This may also be the case if the slip is to contain a solvent or vehicle different from the alcohol that is released.

Slips in which the present binding agents are used, and which are suitable for the coating of substrates and for investment molding are composed of the chelated polymeric titanate and a silicon-free, finely divided refractory such as zirconium oxide, aluminum oxide or magnesium oxide; CaO or $Y_2O_3$ can also be used as refractory substances. In this case both the grain-size distribution of the refractory substances and the viscosity of the slip, which is to amount to about 20 to 80 seconds pour time (DIN pouring cup, 4 mm nozzle) and can be corrected if necessary by the addition of suitable solvents such as ethylglycol, are important. When zirconium oxide is used, a ratio of admixture of binding agent to zirconium oxide of 1:3.3, and a grain-size composition of two parts 0 to 60 micrometers plus one part 0 to 10 micrometers, have been found appropriate.

The slips obtained with the binding agents of the invention are used for making, in a known manner, coatings or investment molds. The coatings made with these compositions have a surface hardness of H (lead-pencil hardness scale) after only 12 hours of air-drying. One hour of heating at 200° C. increases the lead-pencil hardness to 2H, and even heating at 700° C. reduces the hardness only to HB. In any case, the coatings are free of crazing. On the other hand, coatings which are made in accordance with the state of the art indicated in U.S. Pat. Nos. 4,459,204 and 4,201,567 are considerably softer after firing at the temperatures given above, for the same period of time; such substantially softer coatings are less able to withstand molten metal flowing over them and are more easily abraded mechanically than is the case with the coatings made with slips of the binding agent of the invention.

The above-described slip is used for the preparation of investment molds in a known manner, by dipping the wax model into the slip, sanding the still moist coating with an appropriate coarser material, and after several hours of drying and curing the coating the procedure is repeated. For reasons of economy, the further build-up of the mold after the third or fourth coat will be performed in a known manner with silicatic binding agents and appropriate refractory material. In this case too, after firing at 1000° C., the molds have abrasion-resistant internal coatings which are of greater hardness and have a finer surface structure than those which are made according to the state of the art.

EXAMPLES

Example 1

470 g of butyl titanate polymer (34% $TiO_2 \simeq 2$ gram atoms of titanium) are placed in a one-liter four-necked flask equipped with stirrer, thermometer, dropping funnel and reflux condenser, and 160 g of acetylacetone (pentanedione-2,4 $\simeq 1.6$ mol gram molecules) are added in portions with stirring, the temperature of the mixture rising to about 45 to 50° C. Then, to complete the reaction, the mixture is heated until the butanol boils (about 100 to 105° C.), and then it is allowed to cool. The binding agent thus prepared is a reddish-brown liquid which contains 25.4% titanium oxide and 18.8% butanol.

Example 2

510 g of butyl titanate monomer (23.5% $TiO_2$, 1.5 mol) is placed in a one-liter four-necked flask equipped with stirrer, thermometer, dropping funnel and reflux condenser, and a mixture of 120 g of acetylacetone (1.2 mol), 21.6 g of water (1.2 mol) and 66.6 g of n-butanol (0.9 mol) is added in portions with stirring, while the temperature of the mixture rises to 55° to 60° C. Then the reflux condenser is replaced with a distillation bridge and the reaction mixture is heated to ebullition while n-butanol (3.3 mol=244 g) is distilled out. The binding agent prepared by this method corresponds to the material obtained in Example 1.

Example 3

510 g of butyl titanate monomer (23.5% $TiO_2$, 1.5 mol) is placed in a one-liter four-necked flask equipped with stirrer, thermometer, dropping funnel and reflux condenser, and a mixture of 134 g of triethanolamine (0.9 mol) 13.5 g of water (0.75 mol) and 22 g of n-butanol (0.3 mol) is added in portions with stirring, while the temperature of the reaction mixture increases to 45 to 50° C. Then the reflux condenser is replaced with a distillation bridge and the reaction mixture is heated to ebullition while n-butanol (1.8 mol=133 g) is removed by distillation. The binding agent contains about 22% of titanium oxide.

Example 4

Example for purposes of comparison 510 g of butyl titanate monomer (23.5% $TiO_2$, 1.5 mol) is placed in a one-liter four-necked flask provided with a stirrer, thermometer, dropping funnel and reflux condenser, and 120 g of acetylacetone (1.2 mol) is added with stirring such that the temperature of the mixture rises to about 65° to 70° C. To complete the reaction the reaction mixture is heated to ebullition (mixture temperature approximately 100° to 105° C.) and then allowed to cool with stirring. The binding agent thus prepared for purposes of comparison is, like the products of Examples 1 and 2, a reddish-brown liquid, but contains only 19.0% of titanium oxide.

Example 5

Preparation of coatings on clay tablets by means of the binding agent of the invention and the one prepared for purposes of comparison, in combination with zirconium oxide (a)

Preparation of the coating composition:
215 g of zirconium oxide of a grain size of 0 to 60 microns and 115 g of zirconium oxide of a grain size of 0 to 10 microns are stirred in each case into 100 g of the binding agents of Examples 2 and 4. These mixtures have a viscosity of 45 to 60 seconds pouring time from the DIN cup with a 4 mm nozzle.

(b)

With the compositions prepared in accordance with (a), commercial, unglazed clay tablets were coated by brushing, and dried for 12 hours in air, 1 hour in the muffle kiln at 200° C., and 1 hour in the muffle kiln at 700° C. The following table shows the results of the lead-pencil hardness testing of the coatings obtained:

| Binding Agent | Lead-pencil hardness after drying at: | | |
| --- | --- | --- | --- |
| | 20° C./12 h | 200° C./1 hh | 700° C./1 h |
| Example 2 | H | 2H | HB |
| Example 4 (comparison) | H | 2B | 6B |

Lead pencil hardness scale:
H → 6H harder,
HB medium,
B → 6B softer.

Example 6

Preparation of investment molds with the binding agent of the invention, combined with zirconium oxide Mixtures of binding agent and zirconium oxide are prepared in accordance with the teaching of Example 5(a) for the dipping of wax models for investment molding. Paraffin-coated reagent glasses of a size of 10×100 mm are substituted for wax models and dipped in these mixtures, and the coating is immediately sanded in a fluidized bed with zirconium oxide of a grain size of 0.12 to 0.25 mm. After drying overnight in a moisture-saturated atmosphere, the dipping and sanding is repeated as above. After repeated drying overnight, four coats of support material made of commercial silicic acid ester hydrolyzate and synthetic mullite are applied in a known manner and cured by ammonia vapor.

The paraffin-covered reagent glass is removed from the investment molds thus obtained, by immersing them briefly in hot water. The remaining ceramic mold is fired for 3 hours in the muffle kiln at 1000° C., and sawed open after cooling in order to judge the quality of the inner surface. The results obtained in Example 5 with regard to surface hardness were confirmed in this procedure.

It will be understood that the Specification and Examples are illustrative but not limitative of the present invention and that other embodiments within the spirit and scope of the invention will suggest themselves to those skilled in the art.

What is claimed is:

1. An improved binding agent based on titanium compounds for slips of refractory material, wherein the improvement comprising the titanium compound being in the form of an hydrous liquid chelated polymeric titanic acid ester, said ester being chelated with 0.2 to 1 gram molecule of chelating agent per gram atom of titanium.

2. The binding agent of claim 1 wherein the ester is an alkyl ester and the alkylester group has 1 to 8 carbon atoms.

3. The binding agent of claim 1 wherein the alkyl ester group has 2 to 5 carbon atoms.

4. The binding agent of claim 2 wherein the titanic acid ester is chelated with a beta-dioxo chelating compound, a poly oxy compound or an oxy-oxo chelating agent.

5. The binding agent of claim 4 wherein the chelating agent is acetylacetone, acetoacetic acid ethyl ester, benzoylacetone, dibenzoylmethane, polyvalent alcohols, polyvalent alcohols containing nitrogen, lactic acid or diacetone alcohol.

6. The binding agent of claim 5 wherein the polyvalent alcohol is ethanediol-1,2, 2-methylpentanediol-(2,4), 2-ethylhexanediol-(1,3), glycerine, di- or triethanolamine.

7. The binding agent of claim 1 wherein the titanic acid ester is chelated with a beta-dioxo chelating compound, a poly oxy compound or an oxy-oxo chelating agent.

8. The binding agent of claim 7 wherein the chelating agent is acetylacetone, acetoacetic acid ethyl ester, benzoylacetone, dibenzoylmethane, polyvalent alcohols, polyvalent alcohols containing nitrogen, lactic acid or diacetone alcohol.

9. The binding agent of claim 1 wherein the polymeric titanic acid ester is chelated with a beta-dioxo compound.

10. The binding agent of claim 1 wherein the polymeric titanic acid ester is chelated with a poly oxy- or oxy-oxo-compound.

11. The binding agent of claim 1 having a titanium oxide content between 20 and 35% by weight.

12. A method of preparing an anhydrous liquid binding agent based on titanium, for slips of refractory material comprising heating tetraalkyl titanate with a predetermined amount of water depending on the desired degree of condensation, and a chelating agent, said titanate being chelated with 0.2 to 1 gram molecule of chelating agent per gram atom of titanium.

13. The method of claim 12 further comprising at least partially removing alkanol split off from the titanate.

14. The method of claim 12 wherein the reaction medium is heated to about the boiling temperature of the alkanol to be split off from the titanate, and the alkanol removed by distillation from the reaction mixture.

* * * * *